United States Patent
Zhou

(10) Patent No.: US 11,887,122 B2
(45) Date of Patent: Jan. 30, 2024

(54) PAYMENT METHODS AND SYSTEMS BASED ON WIRELESS COMMUNICATION AND BIOMETRIC FEATURES

(71) Applicant: ALIPAY (HANGZHOU) INFORMATION TECHNOLOGY CO., LTD., Zhejiang (CN)

(72) Inventor: Jinliang Zhou, Hangzhou (CN)

(73) Assignee: Alipay (Hangzhou) Information Technology Co., Ltd., Hangzhou (CN)

(*) Notice: Subject to any disclaimer, the term of this patent is extended or adjusted under 35 U.S.C. 154(b) by 200 days.

(21) Appl. No.: 17/362,584

(22) Filed: Jun. 29, 2021

(65) Prior Publication Data
US 2022/0101332 A1  Mar. 31, 2022

(30) Foreign Application Priority Data
Sep. 27, 2020  (CN) .......................... 202011029113.6

(51) Int. Cl.
G06Q 20/40  (2012.01)
H04W 4/80  (2018.01)
(Continued)

(52) U.S. Cl.
CPC ....... G06Q 20/40145 (2013.01); G06F 21/32 (2013.01); G06Q 20/3223 (2013.01);
(Continued)

(58) Field of Classification Search
CPC ....... G06F 21/316; G06K 9/46; H04W 12/06; H04L 63/0861
See application file for complete search history.

(56) References Cited

U.S. PATENT DOCUMENTS

| 11,468,433 B1* | 10/2022 | Lieberman | G06Q 20/3674 |
| 2012/0166810 A1* | 6/2012 | Tao | G06F 21/32 |
| | | | 713/186 |

(Continued)

FOREIGN PATENT DOCUMENTS

| CN | 103810598 | 5/2014 |
| CN | 104715360 | 6/2015 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Extended European Search Report in European Application No. 21182427.1, dated Dec. 3, 2021, 11 pages.

*Primary Examiner* — Ojo O Oyebisi
(74) *Attorney, Agent, or Firm* — Fish & Richardson P.C.

(57) ABSTRACT

Disclosed herein are methods, systems, and apparatus, including computer programs encoded on computer storage media, for payment based on wireless communication and biological features. One of the methods includes determining at least one wireless communications device is within a wireless communication range of a payment collection system. Data specifying at least one account associated with the at least one wireless communications device and data specifying a biometric feature associated with the at least one account is obtained from a payment platform. The payment collection system collects a target biometric feature of a target user. In response to determining that the target biometric feature matches the biometric feature associated with the at least one account, a target account of the target user is determined based on the at least one account, and a deduction operation is performed on the target account.

17 Claims, 7 Drawing Sheets

(51) Int. Cl.
  *G06V 40/18* (2022.01)
  *G06V 40/12* (2022.01)
  *G06V 40/16* (2022.01)
  *G06F 21/32* (2013.01)
  *G06Q 20/32* (2012.01)
  *G06Q 40/02* (2023.01)
  *H04L 9/40* (2022.01)

(52) U.S. Cl.
  CPC ..... *G06Q 20/3224* (2013.01); *G06Q 20/3278* (2013.01); *G06Q 20/409* (2013.01); *G06Q 40/02* (2013.01); *G06V 40/1365* (2022.01); *G06V 40/172* (2022.01); *G06V 40/197* (2022.01); *H04L 63/0492* (2013.01); *H04W 4/80* (2018.02)

(56) References Cited

U.S. PATENT DOCUMENTS

2017/0076269 A1   3/2017   Saeed et al.
2017/0185988 A1   6/2017   Hu et al.
2020/0058032 A1*  2/2020   Lad .................. G06F 21/316

FOREIGN PATENT DOCUMENTS

| CN | 107507003 | 12/2017 |
| CN | 108830591 | 11/2018 |
| CN | 110135250 | 8/2019 |
| WO | WO 2007095002 | 8/2007 |
| WO | WO 2017075063 | 5/2017 |

\* cited by examiner

PAYMENT METHODS AND SYSTEMS BASED ON WIRELESS COMMUNICATION AND BIOMETRIC FEATURES

CROSS-REFERENCE TO RELATED APPLICATIONS

This application claims priority to Chinese Patent Application No. 202011029113.6, filed on Sep. 27, 2020, which is hereby incorporated by reference in its entirety.

TECHNICAL FIELD

The present specification relates to the field of Internet technologies, and in particular, to payment methods and systems based on wireless communication and biometric features.

BACKGROUND

With the popularity and development of mobile payment technologies, mobile payment not only brings more convenience to people in daily life, but also gradually changes the daily travel mode of people. Nowadays, in the public transport industry, more public transports begin to support mobile payment so that users can use mobile devices to make payment and quickly enter or exit stations when travelling on public transports. For example, when users take public transport tools such as subways or buses, the users can use quick response (QR) codes to perform verification and pay fees. In addition, the users can pay by swiping the bus card. Regardless of the payment method, the users need to carry payment devices such as mobile phones or bus cards, and operate the payment devices on a card reader machine of a bus system, which affects convenience to a certain extent. In addition, QR code-based verification depends on mobile devices to a certain extent. When the mobile devices are powered off, the users cannot take a bus.

Based on the existing technologies, payment methods and systems based on wireless communication and biometric features provided in the present specification can provide a more convenient method for paying fees.

SUMMARY

Payment methods and systems based on wireless communication and biometric features provided in the present specification can provide a more convenient method for paying fees.

According to a first aspect, the present specification provides a payment method based on wireless communication and biometric features, applied to a payment collection system and including the following: At least one wireless communications device that enters a wireless communication range of the payment collection system is recognized, and a short-range wireless communication connection is made to the at least one wireless communications device; at least one account associated with the at least one wireless communications device and a biometric feature associated with the at least one account are obtained from a payment platform, where the at least one wireless communications device is in a one-to-one correspondence with the at least one account, the payment platform stores multiple accounts and a wireless communications device and a biometric feature associated with each of the multiple accounts, and the multiple accounts include the at least one account; a target biometric feature of a target user is collected, the target biometric feature is matched with the biometric feature associated with the at least one account, and a target account corresponding to the target user is determined from the at least one account, where a biometric feature associated with the target account matches the target biometric feature; and the payment platform is instructed to perform a deduction operation on the target account.

In some embodiments, the short-range wireless communication includes near filed communication (NFC), and the wireless communications device includes an NFC device.

In some embodiments, the biometric feature includes at least one of a palmprint feature and a facial feature.

In some embodiments, the biometric feature includes at least one of a facial feature, a palmprint feature, an iris feature, a scleral feature, a fingerprint feature, a voiceprint feature, and a bone feature.

In some embodiments, the payment collection system includes a payment collection system of a public transport system.

In some embodiments, the recognizing at least one wireless communications device that enters a wireless communication range of the payment collection system includes: establishing a short-range wireless communication connection to the at least one wireless communications device that enters the wireless communication range of the payment collection system; and obtaining a device identifier of the at least one wireless communications device based on the short-range wireless communication connection.

In some embodiments, the obtaining a device identifier of the at least one wireless communications device includes: obtaining a device identifier ciphertext of the at least one wireless communications device, where the device identifier ciphertext is obtained through encryption based on a predetermined encryption rule; and decrypting the device identifier ciphertext based on a decryption rule corresponding to the predetermined encryption rule, to obtain the device identifier of the at least one wireless communications device.

In some embodiments, the obtaining at least one account associated with the at least one wireless communications device and a biometric feature associated with the at least one account from a payment platform includes: sending a biometric feature acquisition request to the payment platform, where the biometric feature acquisition request includes the device identifier of the at least one wireless communications device; and receiving the at least one account and the biometric feature associated with the at least one account that are sent by the payment platform.

In some embodiments, the instructing the payment platform to perform a deduction operation on the target account includes: sending a deduction operation request for the target account to the payment platform, where the deduction operation request includes a deduction fee; and receiving the deduction fee transferred by the payment platform from the target account.

In some embodiments, the deduction operation request further includes the target biometric feature.

In some embodiments, a payment protocol is created between the payment collection system and the payment platform in advance.

According to a second aspect, the present specification provides a payment system based on wireless communication and biometric features, including a payment collection system that includes: at least one storage medium, where the at least one storage medium stores at least one instruction set for payment based on wireless communication and biometric features; and at least one processor that is communicatively connected to the at least one storage medium, where when the payment system based on wireless communication and biometric features runs, the at least one processor reads the at least one instruction set and implements the payment method based on wireless communication and biometric features according to the first aspect of the present specification.

In some embodiments, the payment collection system includes: a payment collection end-user device, including a wireless communications module, configured to establish a short-range wireless communication connection to at least one wireless communications device within a wireless communication range; and a payment collection server, communicatively connected to the payment collection end-user device and configured to perform data transmission with a payment platform.

In some embodiments, the payment collection end-user device further includes a collection device, configured to collect a target biometric feature.

According to a third aspect, the present specification provides a payment method based on wireless communication and biometric features, applied to a payment platform, where the payment platform stores multiple accounts and a wireless communications device and a biometric feature associated with each of the multiple accounts, and the method includes the following: A biometric feature acquisition request sent by a payment collection system is received, where the biometric feature acquisition request includes a device identifier of at least one wireless communications device, and the at least one wireless communications device falls within a wireless communication range of the payment collection system and has a short-range wireless communication connection to the payment collection system; at least one account associated with the at least one wireless communications device and a biometric feature associated with the at least one account are determined based on the device identifier of the at least one wireless communications device, where the multiple accounts include the at least one account; the at least one account and the biometric feature associated with the at least one account are sent to the payment collection system; a deduction operation request sent by the payment collection system for a target account corresponding to a target user is received, where the at least one account includes the target account, the deduction operation request includes a deduction fee, the payment collection system matches a target biometric feature of the target user with the biometric feature associated with the at least one account, and determines the target account from the at least one account, and a biometric feature associated with the target account matches the target biometric feature; and the deduction fee is transferred from the target account to the payment collection system.

In some embodiments, the deduction operation request further includes the target biometric feature of the target user; and the transferring the deduction fee from the target account to the payment collection system includes: matching the target biometric feature with the biometric feature associated with the target account to determine that the target biometric feature matches the biometric feature associated with the target account; and transferring the deduction fee from the target account to the payment collection system.

In some embodiments, the wireless communications device includes an NFC device.

In some embodiments, the biometric feature includes at least one of a palmprint feature and a facial feature.

In some embodiments, the biometric feature includes at least one of a facial feature, a palmprint feature, an iris feature, a scleral feature, a fingerprint feature, a voiceprint feature, and a bone feature.

In some embodiments, the payment collection system includes a payment collection system of a public transport system.

In some embodiments, a payment protocol is created between the payment collection system and the payment platform in advance.

According to a fourth aspect, the present specification provides a payment system based on wireless communication and biometric features, including a payment system that includes: at least one storage medium, where the at least one storage medium stores at least one instruction set for payment based on wireless communication and biometric features; and at least one processor that is communicatively connected to the at least one storage medium, where when the payment system based on wireless communication and biometric features runs, the at least one processor reads the at least one instruction set and implements the payment method based on wireless communication and biometric features according to the third aspect of the present specification.

It can be understood from the previous technical solutions that according to the payment methods and systems based on wireless communication and biometric features provided in the present specification, a payment (electronic wallet) account is associated with a wireless communications device of a user and a biometric feature of the user, and a wireless communications module is disposed on a device of a payment collection system. When the user with a wireless communications device enters a wireless communication range of the wireless communications module of the payment collection system, the wireless communications module of the payment collection system establishes a short-range wireless communication connection to the wireless communications device of the user, and obtains a device identifier of the wireless communications device of the user. The payment collection system can obtain a biometric feature associated with the wireless communications device from a payment platform (electronic wallet server) based on the device identifier of the wireless communications device, and match a collected target biometric feature of the target user with the biometric feature obtained from the payment platform so as to quickly determine a target account corresponding to the target user, and deduct a fee from the target account. According to the methods and the systems, the biometric feature associated with the wireless communications device within the wireless communication range of the payment collection system can be obtained based on the wireless communications device, and only the target biometric feature of the target user and the biometric feature within the wireless communication range need to be matched and authenticated so that the target account corresponding to the target user can be quickly recognized without matching the target biometric feature of the target user with all biometric features on the payment platform. In other words, according to the methods and the systems provided in the present specification, when the target biometric feature of the target user is to be recognized, the base of biometric feature recognition is narrowed from all the biometric features on the payment platform to the biometric feature associated with the wireless communications device detected in the wireless communication range of the payment collection system, which can significantly improve the biometric feature recognition efficiency, reduce a processing delay for matching when the user performs biometric feature recognition, and improve the speed of the user for paying the fee. In addition, according to the methods and the systems provided in the present specification, there is no need to depend on mobile devices so that payment can be normally performed even when mobile devices cannot be used, there is no need to take out mobile devices or bus cards to perform code scanning or card swiping during payment, and users only need to carry associated wireless communications devices, so that the payment convenience and payment speed are significantly improved.

Some of other functions of the payment methods and systems based on wireless communication and biometric features provided in the present specification are listed in the following description. Based on the description, the following numbers and examples are clear to a person of ordinary skill in the art. The creative aspects of the payment methods and systems based on wireless communication and biometric features provided in the present specification can be fully explained by practicing or using the methods, apparatus, and combinations described in the following detailed examples.

BRIEF DESCRIPTION OF DRAWINGS

To describe the technical solutions in the embodiments of the present specification more clearly, the following is a brief introduction of the accompanying drawings for illustrating such embodiments. Clearly, the accompanying drawings described below are merely some embodiments of the present specification, and a person of ordinary skill in the art can derive other drawings from such accompanying drawings without making innovative efforts.

DESCRIPTION OF EMBODIMENTS

Figure 1:
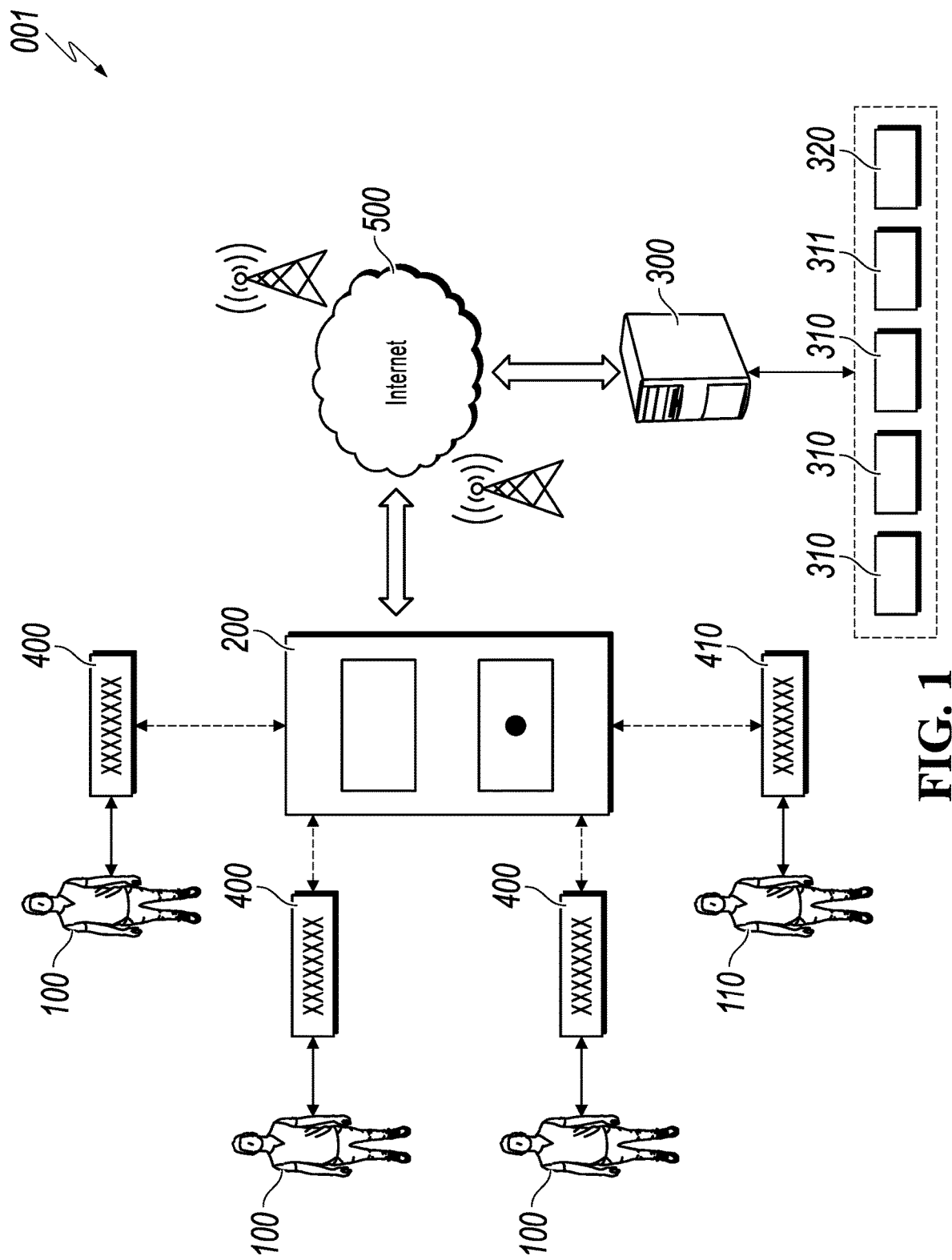
FIG. 1 is a schematic diagram illustrating an example of a payment system based on wireless communication and biometric features, according to one or more embodiments of the present specification.

The following description provides specific application scenarios and needs for the present specification, to enable a person skilled in the art to manufacture and use the content of the present specification. For a person of ordinary skill in the art, various local modifications to the disclosed embodiments are clear, and the general principles described here can be applied to other embodiments and applications without departing from the spirit and scope of the present specification. Therefore, the present specification is not limited to the embodiments shown, but includes the widest range consistent with the claims.

The terms used here are intended only to describe the purpose of a particular example embodiment and are not restrictive. For example, unless the context specifies otherwise, the singular forms "one", "a" and "the" used here can also include plural forms. When used in the present specification, the terms "include", "comprise" and/or "contain" mean or means an associated integer, step, operation, element and/or component without excluding the presence of one or more other features, integers, steps, operations, elements, components and/or groups or with the possibility of adding other features, integers, steps, operations, elements, components and/or groups to the system/method.

Taking into account the following description, these and other features of the present specification, operations and functions of the related elements of the structures, and economic performance of combining and manufacturing the components can be significantly improved. With reference to the accompanying drawings, all these form part of the present specification. It should be clearly understood, however, that the accompanying drawings are for purposes of illustration only and are not intended to limit the scope of the present specification. It should also be understood that the accompanying drawings are not drawn to scale.

The flowcharts used in the present specification illustrate operations implemented by systems according to some embodiments of the present specification. It should be clearly understood that operations in the flowcharts may not be implemented in sequence. In contrast, operations can be implemented in reverse order or simultaneously. In addition, one or more other operations can be added to the flowcharts. One or more operations can be removed from the flowcharts.

For ease of understanding, the possible term in the present specification is first explained as follows:

Near field communication (NFC): Devices (e.g., mobile phones) using an NFC technology can exchange data when being close to each other, which is evolved from integration of a contactless radio frequency identification (RFID) technology and an interconnection and interworking technology.

In the existing technologies, mobile payment can include QR code payment and biometric feature recognition-based payment. For example, a payment collection device obtains account information of a user by scanning a QR code on a mobile device of the user so that a payment operation is performed. For another example, a biometric feature collection device is disposed on a payment collection device, and a biometric feature of a user is collected and matched in the cloud so as to determine account information of the user and perform a payment operation. For example, common biometric feature recognition technologies can include a facial recognition technology, a fingerprint recognition technology, and a palmprint recognition technology. QR code payment is highly dependent on mobile devices, and therefore, is less convenient than biometric feature recognition-based payment. In biometric feature recognition-based payment, a payment platform needs to match a collected biometric feature of a user with all biometric feature samples stored in the cloud to determine an account of the user, which needs a large matching calculation amount and is time-consuming, and therefore, is not applicable to some quick recognition and payment scenarios. For example, in the public transport field, e.g., on buses, subways, or light rails crowded with people. When a user takes a public transport, the user needs to quickly pay a fee or quickly pass a turnstile to avoid the traffic jam. Therefore, the needs on the payment speed are very high in the public transport field.

According to the payment methods and systems based on wireless communication and biometric features provided in the present specification, a payment (electronic wallet) account is associated with a wireless communications device of a user and a biometric feature of the user. A payment collection system can sense all wireless communications devices within a wireless communication range in advance, and obtain biometric features associated with all the wireless communications devices within the wireless communication range from a payment platform (payment platform cloud server). The payment collection system only needs to match the biometric feature of the user with the biometric features obtained from the payment platform to quickly determine an account corresponding to the user without matching the biometric feature of the user with all biometric features on the payment platform, so that a sample base of biometric feature recognition is significantly narrowed, and the biometric feature recognition efficiency is improved. In addition, according to the methods and the systems provided in the present specification, there is no need to depend on mobile devices and use the mobile devices to show QR codes so that payment can be normally performed even when mobile devices cannot be used, there is no need to take out mobile devices or bus cards to perform code scanning or card swiping during payment, and users only need to carry associated wireless communications devices, so that the payment convenience and payment speed are significantly improved.

The payment methods and systems based on wireless communication and biometric features provided in the present specification can be applied to payment in the public transport field to shorten the payment time and improve the passing speed, can be applied to other payment scenarios to shorten the payment time and make payment more convenient, for example, mobile payment in shopping malls, mobile payment in supermarkets, and mobile payment on vending machines; and can also be applied to identity detection and recognition, for example, identity authentication and detection at stations in the public transport field. For convenience of illustration, the following embodiments use the public transport field as an example for detailed description.

FIG. 1 is a schematic diagram illustrating an example of a payment system 001 based on wireless communication and biometric features (hereinafter referred to as a system 001). The system 001 can include a user 100, a payment collection system 200, a payment platform 300, a wireless communications device 400, and the Internet 500.

The user 100 and the payment collection system 200 can conduct a target transaction. The target transaction can include a service transaction. The service transaction can include but is not limited to taking a bus, subway, plane, or train, a catering service, and a hotel service. The target transaction can include a product transaction. Products can include tangible products and intangible products. For example, the tangible products can include but are not limited to home appliances and books, and the intangible products can include but are not limited to shares and options.

The target transaction includes that the user 100 pays a target number of virtual resources to the payment collection system 200. For example, the virtual resources can be digital currencies. The digital currencies can include a digital representation of entity currencies. The digital currencies can also include virtual digital currencies.

The user 100 can be the payer of the target transaction, and the payment collection system 200 is the payee of the target transaction. The target transaction further includes that the payment collection system 200 provides a service or a product for the user 100. The user 100 is the user of the service and/or the buyer of the product, and the payment collection system 200 is the provider of the service and/or the seller (i.e., the merchant) of the product.

The user 100 can be the user of the service. The payment collection system 200 and the payment platform 300 can jointly provide the service for the user 100. The service can include but is not limited to use of a public transport, a taxi service, entrusted payment on a mobile phone application, and credit-based payment of an unattended container. The public transport includes but is not limited to a subway and a bus.

As shown in FIG. 1, the user 100 can be a user within a wireless communication range of the payment collection system 200. The user 100 can be a user who is preparing to pay by using the payment collection system 200 near the payment collection system 200. For example, the user 100 can be a user who queues to pass a turnstile of a subway, or can be a user who queues to pay on a bus.

Each user 100 can have one wireless communications device 400 or at least one wireless communications device 400. The wireless communications device can be an NFC device, a Wi-Fi device, a Bluetooth device, etc. The wireless communications device can communicate wirelessly with other devices with the same wireless communication protocol. The wireless communication can be short-range wireless communication, for example, NFC, Wi-Fi communication, or Bluetooth communication. For example, the NFC device can exchange wireless data with other NFC devices based on an NFC connection. For example, the Wi-Fi device can exchange wireless data with other Wi-Fi devices based on a Wi-Fi connection. For example, the Bluetooth device can exchange wireless data with other Bluetooth devices based on a Bluetooth connection.

When the wireless communications device 400 falls within the wireless communication range of the payment collection system 200, the wireless communications device 400 can make a short-range wireless communication connection to the payment collection system 200. The short-range wireless communication connection can be a short-range NFC connection, a Wi-Fi-based short-range wireless communication connection, a Bluetooth-based short-range wireless communication connection, etc. The wireless communication range can be adjusted based on different scenarios. For example, in a public transport system, the wireless communication range can be 1 m, 2 m, or 3 m of the wireless communications device. For example, in mobile payment, the wireless communication range can be 0.5 m of the wireless communications device. In summary, the wireless communication range can be determined or changed based on needs.

A distance between each user 100 and a corresponding wireless communications device 400 should fall within a predetermined range. When the wireless communications device 400 falls within the wireless communication range of the payment collection system 200, the user 100 corresponding to the wireless communications device 400 should also fall within the wireless communication range of the payment system 200. For example, the user 100 can carry the wireless communications device 400, and the predetermined range can be 0.1 m, 0.2 m, or 0.3 m, or can be another distance.

Each wireless communications device 400 has a unique device identifier, which can be a unique tag of the wireless communications device 400. For ease of description, an example that the wireless communications device is an NFC device is used for description in the present specification.

The NFC device 400 can be a passive NFC device, or can be an active NFC device. The NFC device 400 can be any form of device with the NFC technology, for example, an NFC card sticker, or a mobile device with the NFC technology, such as a smartphone, a wearable smart device, or a mobile computer. The user 100 can carry the NFC device 400. For example, the NFC card sticker can be pasted on the device carried, for example, pasted on a mobile phone. Each NFC device 400 has a unique device identifier, which can be a unique tag of the NFC device 400. The NFC device 400 can perform wireless data transmission with other NFC devices 400. The NFC device 400 can also perform wireless data transmission with an NFC module 210 in the payment collection system 200. The wireless data transmission can be encrypted wireless data transmission or unencrypted wireless data transmission.

A target user 110 can be a user who is paying currently. For example, the target user 110 can be a user who is currently paying using the NFC device 400, or can be a user who is paying a fee on a bus currently. The user 100 can include the target user 110. The target user 110 carries a target wireless communications device 410. The wireless communications device 400 includes the target wireless communications device 410.

The payment platform 300 can provide a solution for the user 100 and the payment collection system 200 with respect to the payment of a fee for the target transaction. The payment platform 300 can be a third-party payment platform. The payment platform 300 can store multiple accounts and a wireless communications device 400 and a biometric feature associated with each of the multiple accounts. The multiple accounts include an account 310 corresponding to the user 100. The account 310 stores a digital currency corresponding to the user 100 corresponding to the account 310. A target account 311 corresponding to the target user 110 is also stored in the payment platform 300. The payment platform 300 can also store a payment collection account 320 corresponding to the payment collection system 200. A payment protocol can be created between the payment collection system 200 and the payment platform 300 in advance. The payment platform 300 can help the payment collection system 200 charge the user 100 through a digital resource transmission channel based on the payment protocol. For example, the payment platform 300 can extract a target number of payment fees from the account 310 corresponding to the user 100 through the digital resource transmission channel, and transfer the payment fees to the payment collection account 320 of the payment collection system 200.

The payment platform 300 can provide a target payment service for the target transaction for the user 100 and the payment collection system 200 as a payment intermediary of the user 100 and the payment collection system 200. The target payment service can be an entrusted payment service. In some embodiments, the entrusted payment service can be a password-free entrusted payment service. The password-free entrusted payment service can include the following: A payer authorizes a payee to send a deduction instruction to the payment platform 300, and authorizes the payment platform 300 to deduct target money from an account of the payer to an account of the payee based on the deduction instruction without obtaining a password from the payer. For example, the payment platform 300 can take out a fee for the target user 110 to enjoy a subway service from the target account 311 of the target user 110, and pay the fee to the payment collection system 200. The target account 311 can be an account of the target user 110 authorized to access the payment platform 300. The target account 311 can be an account of the target user 110 partially managed by the payment system under authorization. For example, the account 310 can include but is not limited to an electronic wallet, a bank card, an e-commerce bank, a financial product, and a credit card. The payment platform 300 can receive the deduction instruction from the payment collection system 200 and deduct a target fee from the target account 311 of the target user 110. The target fee is a fee for the target user 110 to enjoy a subway service.

The wireless communications device 400 carried by the user 100 and biometric feature data of the user 100 can be associated with the account 310 corresponding to the user 100. The payment collection system 200 can quickly obtain a biometric feature associated with the wireless communications device based on a device identifier of the wireless communications device, so as to improve the speed and the accuracy of biometric feature recognition. Specifically, the user 100 can associate the wireless communications device 400 of the user 100 and the biometric feature data of the user 100 with the corresponding account 310 by using the payment platform 300. In other words, the user 100 can associate the wireless communications device 400 carried with the biometric feature data of the user 100. The target wireless communications device 410 carried by the target user 110 and a target biometric feature of the target user 110 are associated with the target account 311. The payment platform 300 can store account information of the account 310 corresponding to the user 100, device information of the wireless communications device of the user 100 associated with the account 310, the biometric feature data of the user 100, etc.

The biometric feature can be a palmprint feature. Compared with facial feature recognition, palmprint feature recognition is a low-sensitivity recognition method. For a user who is highly sensitive to privacy, palmprint feature recognition does not easily annoy the user, has more privacy, and is more easily accepted by the user.

The biometric feature can be at least one of a facial feature and a palmprint feature. Both facial feature recognition and palmprint feature recognition are contactless biometric feature recognition methods, through which users only need to align the face or the palm with a camera, so that it is more convenient to use and experience is better. Therefore, the methods are applicable to more scenarios. Moreover, contactless biometric feature recognition is more hygienic than contact biometric feature recognition. In particular, during a sensitive period such as an epidemic, the contactless biometric feature recognition method is more easily accepted by users. The user 100 can select the type of a biometric feature associated with the account 310 based on the user's sensitivity to privacy.

The biometric feature can be at least one of a facial feature, a palmprint feature, an iris feature, a scleral feature, a fingerprint feature, a voiceprint feature, and a bone feature. In addition to facial feature recognition and palmprint feature recognition, biometric feature recognition can be recognition based on an iris feature, a sclera feature, a fingerprint feature, a voiceprint feature, a bone feature, etc. Different biometric feature recognition methods apply to different scenarios. The user 100 and the payment collection system 200 can select a suitable biometric feature recognition method based on different scenarios.

It is worthwhile to note that the payment collection system 200 can be another system that can collect a biometric feature to perform identity recognition, for example, an identity authentication system or an identity recognition system in the public transport field. Therefore, in some embodiments, the payment collection system 200 can also be referred to as an identity recognition system 200.

The payment platform 300 can be another third-party system that stores identity information of the user 110, for example, a public security system and a server that stores the identity information of the user 100 in the public transport field, or can be a server that provides the background identity information query service support for the identity recognition system 200. Therefore, in some embodiments, the payment platform 300 can also be referred to as an identity information server 300. The identity information server 300 can store any form of information related to the identity of the user 100, for example, personal data (e.g., name, age, occupation, identity card information, and contact information), a related account, a device identifier of the associated wireless communications device 400, and an associated biometric feature. The account 310 corresponding to the user 100 can be an identity such as identity card information, an email account number, a telephone number, etc. of the user 100. The information related to the identity of the user 100 can be associated with the account 310 corresponding to the user 100.

Figure 2:
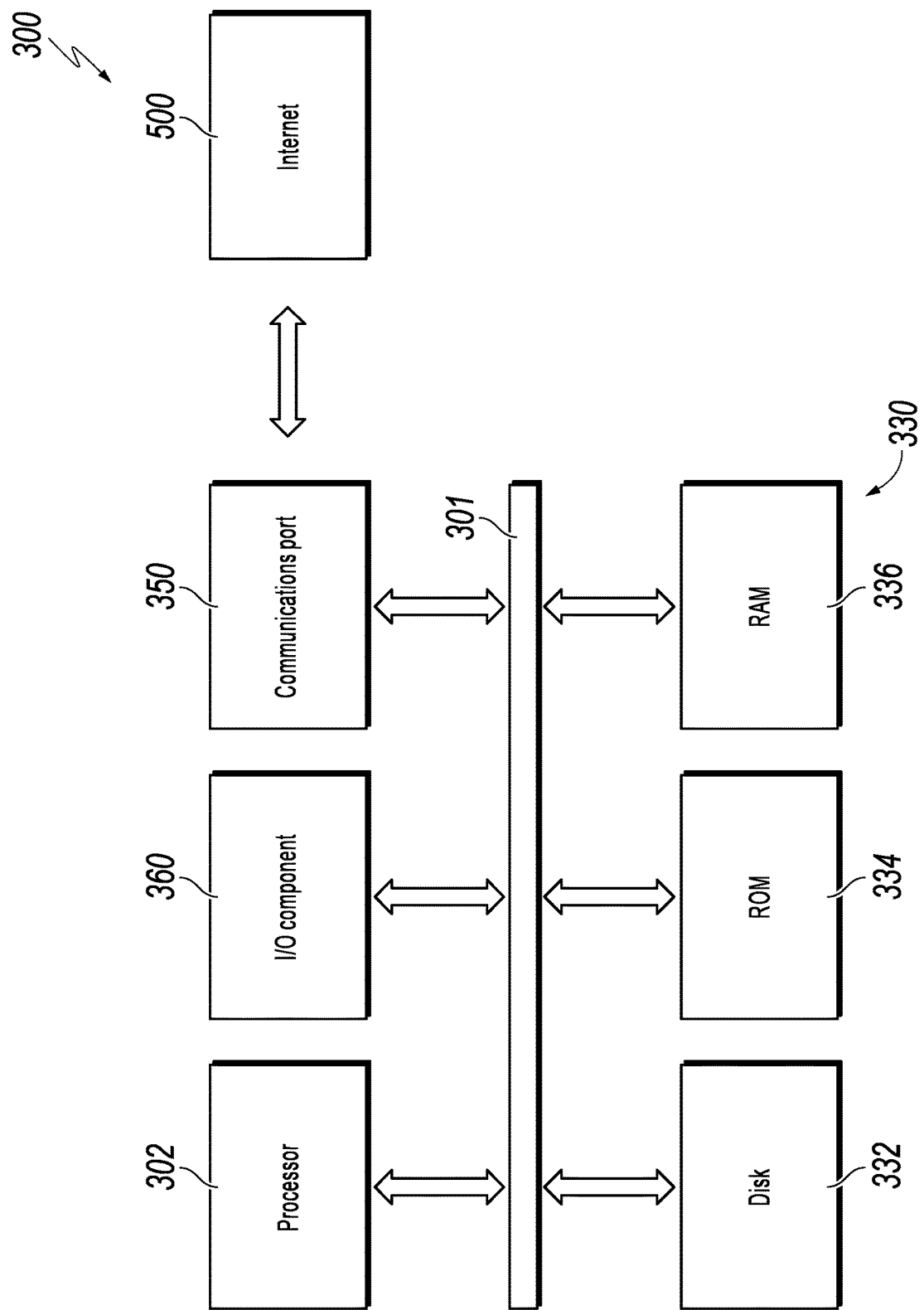
FIG. 2 is a schematic hardware diagram illustrating an example of a payment platform, according to one or more embodiments of the present specification.

FIG. 2 is a schematic hardware diagram illustrating an example of a payment platform 300, according to one or more embodiments of the present specification. The payment platform 300 can store data or instructions for performing the payment method based on wireless communication and biometric features described in the present specification, and can execute or be configured to execute the data and/or instructions. The payment platform 300 can also store data or instructions for performing the method for associating a wireless communications device with a biometric feature described in the present specification, and can execute or be configured to execute the data and/or instructions. The payment method based on wireless communication and biometric features and the method for associating a wireless communications device with a biometric feature are described in other parts of the present specification. For example, a payment method P100 based on wireless communication and biometric features is described in the descriptions of FIG. 4, and a method P200 for associating a wireless communications device with a biometric feature is described in the descriptions of FIG. 6.

As shown in FIG. 2, the payment platform 300 includes at least one storage medium 330 and at least one processor 302. In some embodiments, the payment platform 300 can further include a communications port 350 and an internal communications bus 301. In addition, the payment platform 300 can further include an I/O component 360.

The internal communications bus 301 can connect different system components, including the storage medium 330 and the processor 302.

The I/O component 360 supports input/output between the payment platform 300 and other components.

The storage medium 330 can include a data storage apparatus. The data storage apparatus can be a non-transitory storage medium, or can be a transitory storage medium. For example, the data storage apparatus can include one or more of a disk 332, a read-only memory (ROM) 334, and a random access memory (RAM) 336. The storage medium 330 further includes at least one instruction set stored in the data storage apparatus. The instruction is computer program code, and the computer program code can include a program, a routine, an object, a component, a data structure, a process, a module, etc. for performing payment methods based on wireless communication and biometric features as described in the present specification.

The communications port 350 is used for data communication between the payment platform 300 and the outside. For example, the payment platform 300 can be connected to the Internet 500 through the communications port 350.

The at least one processor 302 is communicatively connected to the at least one storage medium 330 through the internal communications bus 301. The at least one processor 302 is configured to execute the at least one instruction set. When the system 001 runs, the at least one processor 302 reads the at least one instruction set and performs the payment method P100 based on wireless communication and biometric features and the method P200 for associating a wireless communications device with a biometric feature provided in the present specification based on instructions of the at least one instruction set. The processor 302 can perform all steps included in the payment method P100 based on wireless communication and biometric features and the method P200 for associating a wireless communications device with a biometric feature. The processor 302 can be one or more processors. In some embodiments, the processor 302 can include one or more hardware processors such as a microcontroller, a microprocessor, a reduced instruction set computer (RISC), an application-specific integrated circuit (ASIC), an application-specific instruction set processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), any circuit or processor or the like that can perform one or more functions, etc., or any combination thereof. For description only, only one processor 302 is described in the payment platform 300 in the present specification. However, it is worthwhile to note that the payment platform 300 in the present specification can further include multiple processors. Therefore, operations and/or method steps disclosed in the present specification can be performed by one processor or can be performed jointly by multiple processors as described in the present specification. For example, if the processor 302 of the payment platform 300 in the present specification performs step A and step B, it should be understood that step A and step B can also be performed jointly or separately by two different processors 302 (e.g., a first processor performs step A and a second processor performs step B, or a first processor and a second processor jointly perform steps A and B).

Figure 3A:
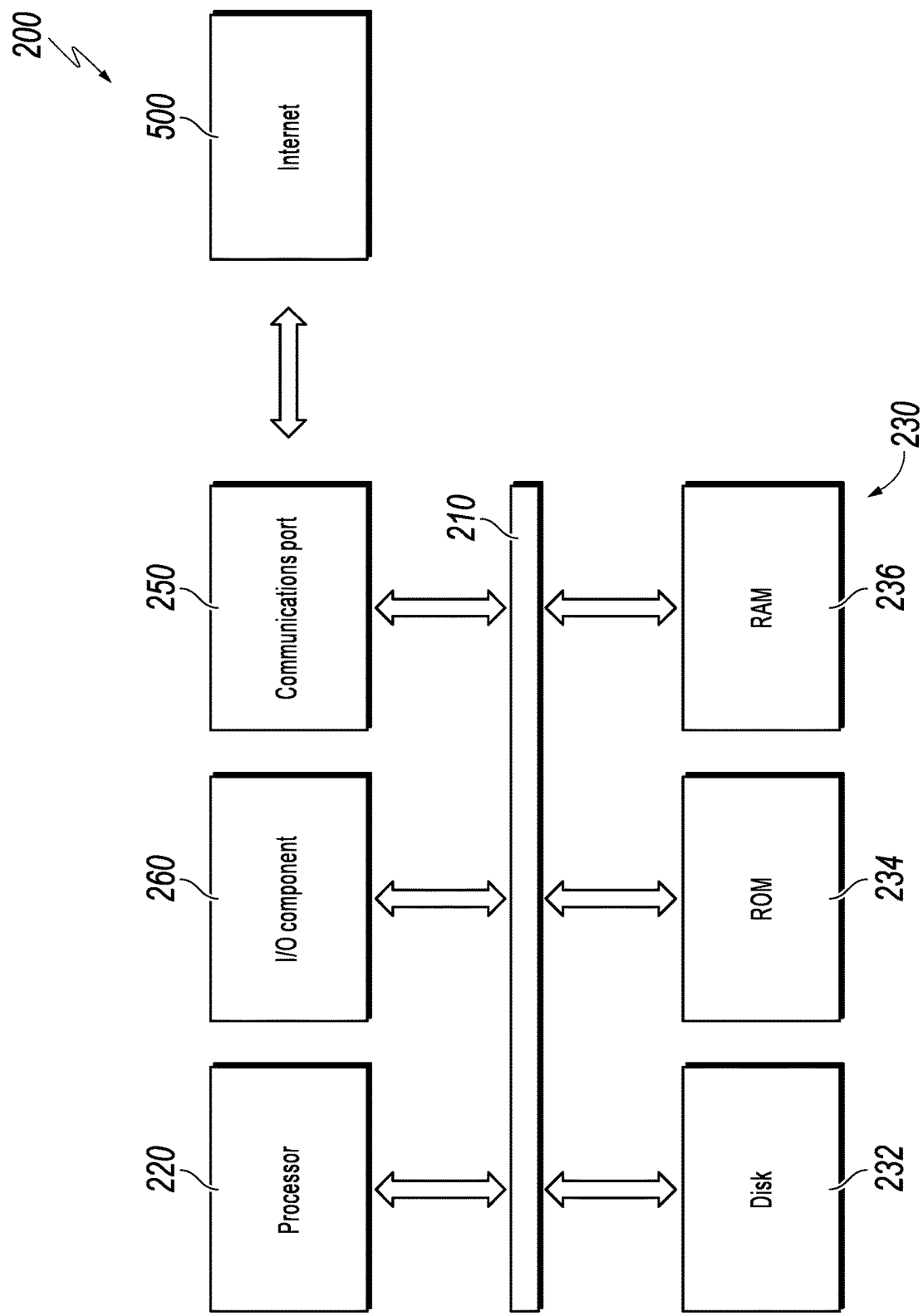
FIG. 3A is a schematic hardware diagram illustrating an example of a payment collection system, according to one or more embodiments of the present specification.

The payment collection system 200 can store data or instructions for performing the payment method P100 based on wireless communication and biometric features described in the present specification, and can execute or be configured to execute the data and/or instructions. The payment collection system 200 can be a payment collection system in the public transport field, for example, a card reader machine system on a bus or a card reader turnstile system in a subway station, or can be a payment collection system in another payment field, for example, a payment collection point of sales (POS) machine system in a shopping mall or an Internet of Things (IOT) payment machine system. FIG. 3A is a schematic hardware diagram illustrating an example of a payment collection system 200.

As shown in FIG. 3A, the payment collection system 200 can include at least one storage medium 230 and at least one processor 220. In some embodiments, the payment collection system 200 can further include a communications port 250 and an internal communications bus 210. In addition, the payment collection system 200 can further include an I/O component 260.

The internal communications bus 210 can connect different system components, including the storage medium 230 and the processor 220.

The I/O component 260 supports input/output between the payment collection system 200 and other components.

The storage medium 230 can include a data storage apparatus. The data storage apparatus can be a non-transitory storage medium, or can be a transitory storage medium. For example, the data storage apparatus can include one or more of a disk 232, a ROM 234, and a RAM 236. The storage medium 230 further includes at least one instruction set stored in the data storage apparatus. The instruction is computer program code, and the computer program code can include a program, a routine, an object, a component, a data structure, a process, a module, etc. for performing the data reporting method provided in the present specification.

The communications port 250 is used for data communication between the payment collection system 200 and the outside.

The at least one processor 220 is communicatively connected to the at least one storage medium 230 through the internal communications bus 210. The at least one processor 220 is configured to execute the at least one instruction set. When the system 001 runs, the at least one processor 220 reads the at least one instruction set and performs the payment method P100 based on wireless communication and biometric features provided in the present specification based on instructions of the at least one instruction set. The processor 220 can perform all steps included in the payment method P100 based on wireless communication and biometric features. The processor 220 can be one or more processors. In some embodiments, the processor 220 can include one or more hardware processors such as a microcontroller, a microprocessor, an RISC, an ASIC, an ASIP, a CPU, a GPU, a PPU, a microcontroller unit, a DSP, an FPGA, an ARM, a PLD, any circuit or processor or the like that can perform one or more functions, etc., or any combination thereof. For description only, only one processor 220 is described in the payment collection system 200 in the present specification. However, it is worthwhile to note that the payment collection system 200 in the present specification can further include multiple processors. Therefore, operations and/or method steps disclosed in the present specification can be performed by one processor or can be performed jointly by multiple processors as described in the present specification. For example, if the processor 220 of the payment collection system 200 in the present specification performs step A and step B, it should be understood that step A and step B can also be performed jointly or separately by two different processors 220 (e.g., a first processor performs step A and a second processor performs step B, or a first processor and a second processor jointly perform steps A and B).

Figure 3B:
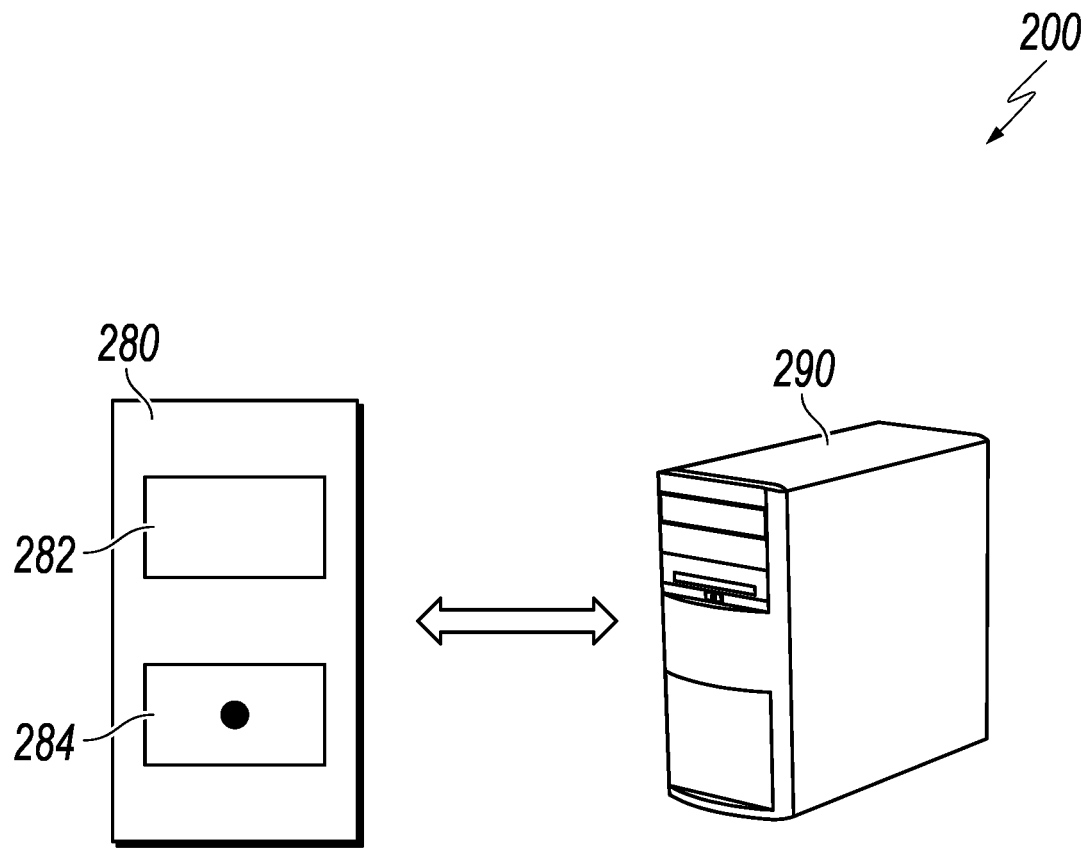
FIG. 3B is a schematic structural diagram illustrating an example of a payment collection system, according to one or more embodiments of the present specification.

FIG. 3B is a schematic structural diagram illustrating a payment collection system 200, according to one or more embodiments of the present specification. Specifically, as shown in FIG. 3B, the payment collection system 200 can include a payment collection end-user device 280 and a payment collection server 290. The payment collection end-user device 280 and the payment collection server 290 can be two independent devices, or can be integrated into one device. The payment collection server 290 can be communicatively connected to the payment collection end-user device 280. The communication connection refers to any form of connection capable of receiving information directly or indirectly. For example, the payment collection end-user device 280 and the payment collection server 290 can establish a wireless connection to transfer data to each other through wireless communication, or the payment collection end-user device 280 and the payment collection server 290 can be directly connected to each other to transfer data through a wire. For example, the payment collection end-user device 280 and the payment collection server 290 can perform wireless communication through the Internet 500.

The payment collection end-user device 280 can be a card reader machine on a bus, a card reader turnstile in a subway station, a payment collection POS machine in a shopping mall, an IOT payment machine, etc. The payment collection end-user device 280 can include a wireless communications module 282. In some embodiments, the payment collection end-user device 280 can further include a collection device 284. The wireless communications module 282 can be configured to establish a short-range wireless communication connection to at least one wireless communications device 400 within a wireless communication range of the wireless communications module 282, and perform short-range wireless communication based on the short-range wireless communication connection. The collection device 284 is configured to collect a biometric feature of the user 100 (including the target user 110). The wireless communications module 282 has the same communication protocol as the wireless communications device 400. For example, the wireless communications module 282 is an NFC module, and the wireless communications device 400 is an NFC device. The collection device 284 can be mounted on the payment collection end-user device 280, or can be deployed on the payment collection end-user device 280 as an independent device.

The payment collection server 290 can be a background server corresponding to the payment collection end-user device 280, for example, a remote background server in a bus system. The payment collection server 290 can receive a device identifier of the wireless communications device 400 collected by the payment collection end-user device 280, or can receive the biometric feature of the user 100 collected by the payment collection end-user device 280. The payment collection server 290 can be communicatively connected to the payment platform 300 and perform data transmission with the payment platform 300 so as to implement data transmission between the payment collection end-user device 280 and the payment platform 300.

The Internet 500 can facilitate the exchange of information and/or data. As shown in FIG. 1, both the payment platform 300 and the payment collection system 200 can be connected to the Internet 500 and transmit information and/or data to each other through the Internet 500. For example, the payment collection system 200 can obtain biometric features and virtual resources from the payment platform 300 through the Internet 500. In some embodiments, the Internet 500 can be any type of wired or wireless network or a combination thereof. For example, the Internet 500 can include a cable network, a wired network, an optical fiber network, a telecommunication network, an intranet, an Internet, a local area network (LAN), a wide area network (WAN), a wireless local area network (WLAN), a metropolitan area network (MAN), a wide area network (WAN), a public switched telephone network (PSTN), a Bluetooth network, a ZigBee network, an NFC network, etc. In some embodiments, the Internet 500 can include one or more network access points through which one or more components of the payment platform 300 and the payment collection system 200 can be connected to the Internet 500 to exchange data and/or information.

Figure 4:
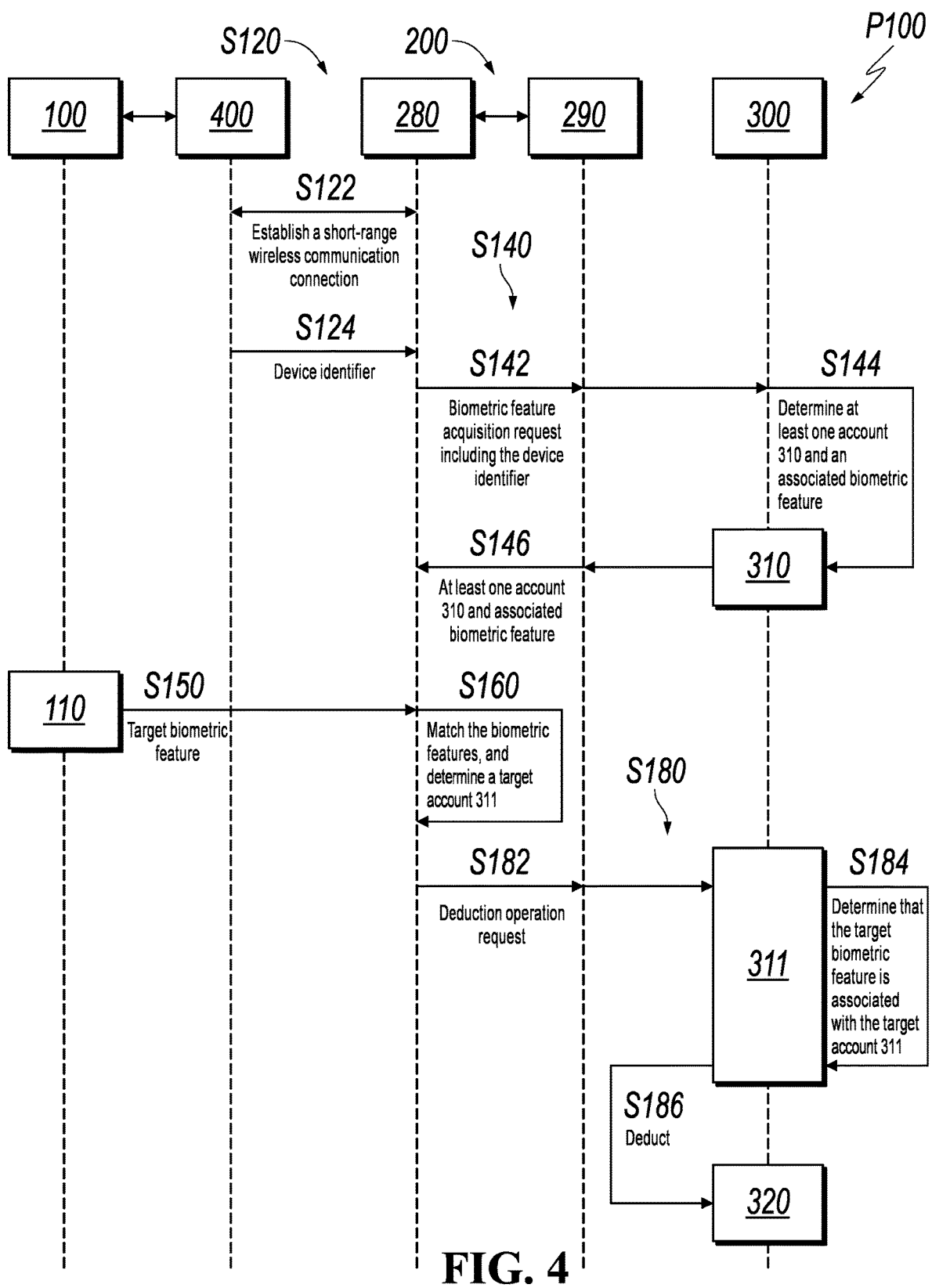
FIG. 4 is a flowchart illustrating an example of a payment method based on wireless communication and biometric features, according to one or more embodiments of the present specification.

FIG. 4 is a flowchart illustrating an example of a payment method P100 based on wireless communication and biometric features. As described above, the payment collection system 200 and the payment platform 300 can perform the method P100 provided in the present specification. Specifically, the processor 220 in the payment collection system 200 can read an instruction set stored in a local storage medium of the payment collection system 200, and the processor 302 in the payment platform 300 can read an instruction set stored in a local storage medium of the payment platform 300, and then perform the method P100 provided in the present specification based on regulations of the instruction set. The method P100 can include the following steps.

S120. The payment collection system 200 recognizes at least one wireless communications device 400 that enters a wireless communication range of the payment collection system 200. Specifically, the payment collection system 200 can detect the at least one wireless communications device 400 that enters the wireless communication range by using the wireless communications module 282, and perform short-range wireless communication with the at least one wireless communications device 400. S120 can include the following steps.

S122. The payment collection system 200 establishes a short-range wireless communication connection such as an NFC connection to the at least one wireless communications device 400 that enters the wireless communication range of the payment collection system 200. Specifically, the wireless communications module 282 of the payment collection end-user device 280 can sense other wireless communications devices in a wireless communication range. When at least one user 100 with at least one corresponding wireless communications device 400 enters the wireless communication range of the wireless communications module 282, the wireless communications module 282 can establish a short-range wireless communication connection to the at least one wireless communications device 400, so as to perform data transmission.

S124. The payment collection system 200 obtains a device identifier of the at least one wireless communications device 400 based on the short-range wireless communication connection. After the wireless communications module 282 establishes the short-range wireless communication connection to the at least one wireless communications device 400, the payment collection end-user device 280 can obtain the device identifier of the at least one wireless communications device 400 based on the short-range wireless communication connection, and send the device identifier of the at least one wireless communications device 400 to the payment collection server 290. The short-range wireless communication connection between the wireless communications module 282 and the at least one wireless communications device 400 can be an unencrypted communication connection or an encrypted communication connection.

To improve the security of data transmission between the wireless communications module 282 and the at least one wireless communications device 400 and avoid misoperation of the wireless communications device 400, the short-range wireless communication connection can be a communication connection encrypted based on a predetermined encryption rule. In other words, the at least one wireless communications device 400 and the wireless communications module 282 of the payment collection end-user device 280 encrypt and decrypt data based on the same encryption rule and the same decryption rule. Specifically, S124 can include the following: The payment collection end-user device 280 obtains a device identifier ciphertext of the at least one wireless communications device 400, where the device identifier ciphertext is obtained through encryption based on a predetermined encryption rule. The payment collection end-user device 280 decrypts the device identifier ciphertext based on a decryption rule corresponding to the predetermined encryption rule, to obtain the device identifier of the at least one wireless communications device 400.

The method P100 can further include the following steps.

S140. The payment collection system 200 obtains at least one account 310 associated with the at least one wireless communications device 400 and a biometric feature associated with the at least one account 310 from the payment platform 300. The multiple accounts include the at least one account 310. Specifically, S140 can include the following steps.

S142. The payment collection system 200 sends a biometric feature acquisition request to the payment platform 300. Specifically, the payment collection end-user device 280 sends the device identifier of the at least one wireless communications device 400 to the payment collection server 290, and the payment collection server 290 generates the biometric feature acquisition request, and sends the biometric feature acquisition request to the payment platform 300. The biometric feature acquisition request includes the device identifier of the at least one wireless communications device 400.

S144. After receiving the biometric feature acquisition request sent by the payment collection system 200, the payment platform 300 determines, based on the device identifier of the at least one wireless communications device 400, the at least one account 310 associated with the at least one wireless communications device 400 and the biometric feature associated with the at least one account 310. Specifically, the payment platform 300 can match the device identifier of the at least one wireless communications device 400 with device identifiers of wireless communications devices 400 associated with all accounts stored in the local storage medium, to determine the at least one account 310 associated with the at least one wireless communications device 400; and determine biometric feature data associated with the at least one account 310 based on the at least one account 310. The at least one wireless communications device 400 is in a one-to-one correspondence with the at least one account 310.

S146. The payment platform 300 sends the at least one account 310 and the biometric feature associated with the at least one account 310 to the payment collection system 200. Specifically, the payment platform 300 can send the biometric feature associated with the at least one account 310 to the payment collection server 290, and the payment collection server 290 can send the biometric feature to the payment collection end-user device 280, or may not send the biometric feature to the payment collection end-user device 280.

In conclusion, the payment collection system 200 can obtain the biometric feature data corresponding to the at least one account 310 associated with the at least one wireless communications device 400 from the payment platform 300 based on the device identifier of the at least one wireless communications device 400 within the wireless communication range. The payment collection system 200 can use the biometric feature data corresponding to the at least one account 310 obtained from the payment platform 300 as a sample of biometric feature recognition, so as to narrow a sample base of biometric feature recognition and improve the speed and the accuracy of recognition.

The method P100 can further include the following steps.

S150. The payment collection system 200 collects a target biometric feature of the target user 110. Specifically, the collection device 284 of the payment collection end-user device 280 can collect the target biometric feature of the target user 110. For example, the collection device 284 can be a camera, and can collect a palmprint image of the target user 110, or can collect a face image of the target user 110, or can collect an iris image, a sclera image, a bone image, etc. of the target user 110. The collection device 284 can be a fingerprint collection apparatus for collecting a fingerprint of the target user 110. The collection device 284 can be a voiceprint collection apparatus for collecting a voiceprint of the target user 110. The payment collection end-user device 280 can send the target biometric feature of the target user 110 to the payment collection server 290, or may not send the target biometric feature of the target user 110 to the payment collection server 290.

S160. The payment collection system 200 matches the target biometric feature of the target user 110 with the biometric feature associated with the at least one account 310, and determines the target account 311 corresponding to the target user 110 from the at least one account 310. The biometric feature associated with the target account 311 matches the target biometric feature. Specifically, S160 can be performed on the payment collection end-user device 280, or can be performed on the payment collection server 290. The payment collection end-user device 280 can send the target biometric feature of the target user 110 to the payment collection server 290, and the payment collection server 290 performs S160. The payment collection server 290 can send the biometric feature of the at least one account 310 to the payment collection end-user device 280, and the payment collection end-user device 280 performs S160. In the embodiment illustrated in FIG. 4, S160 is performed by the payment collection end-user device 280. A person skilled in the art should understand that, that S160 is performed on the payment collection server 290 also falls within the protection scope of the present specification. It is worthwhile to note that the payment collection system 200 can determine identity information of the target user 110 based on the target account 311 of the target user 110, so as to perform identity authentication or identity recognition on the target user 110.

S180. The payment collection system 200 instructs the payment platform 300 to perform a deduction operation on the target account 311. Specifically, S180 can include the following steps.

S182. The payment collection system 200 sends a deduction operation request for the target account 311 to the payment platform 300. The deduction operation request includes a deduction fee. The deduction fee can be a target fee, for example, a fee for the target user 110 to enjoy a subway service or a bus service. The deduction fee can be predetermined by the payment collection system 200 based on a specific rule.

In some embodiments, the deduction operation request can further include the biometric feature of the target user 100, used by the payment platform 300 to perform identity authentication on the target user 110.

S184. The payment platform 300 matches the target biometric feature of the target user 110 with the biometric feature associated with the target account 311, to perform identity authentication on the target user 110. When the target biometric feature of the target user 110 matches the biometric feature associated with the target account 311, the payment platform 300 determines that the target biometric feature of the target user 110 is associated with the target account 311, in other words, the target biometric feature of the target user 110 succeeds in identity authentication, and the target user 110 is a user corresponding to the target account 311.

S186. The payment platform 300 transfers the deduction fee from the target account 311 to the payment collection system 200. Specifically, the payment platform 300 transfers the deduction fee from the target account 311 to a payment collection account 320 corresponding to the payment collection system 200.

After receiving the deduction fee transferred by the payment platform 300 from the target account 311, the payment collection system 200 can generate feedback information of successful payment to the payment collection end-user device 280, so as to remind the target user 110 that the payment succeeds. For example, the payment collection end-user device 280 can display words "Payment succeeds", "Pass allowed", etc. on the screen. The payment collection end-user device 280 can also utter a voice to remind the target user 110 that the payment succeeds, for example, "Please get in", "Payment succeeds", or "Please pass".

In conclusion, according to the payment method P100 and system 001 based on wireless communication and biometric features provided in the present specification, the wireless communications device 400 and the biometric feature are bound to the account 310, the wireless communications device 400 within the wireless communication range is recognized by using the payment collection system 200, and a sample base of biometric feature recognition is narrowed from all samples on the payment platform 300 to the wireless communications device 400 within the wireless communication range, so that the speed and the accuracy of biometric feature recognition can be improved, the passing speed can be improved, and the payment time is shortened, thereby improving the efficiency and the user experience.

Figure 5:
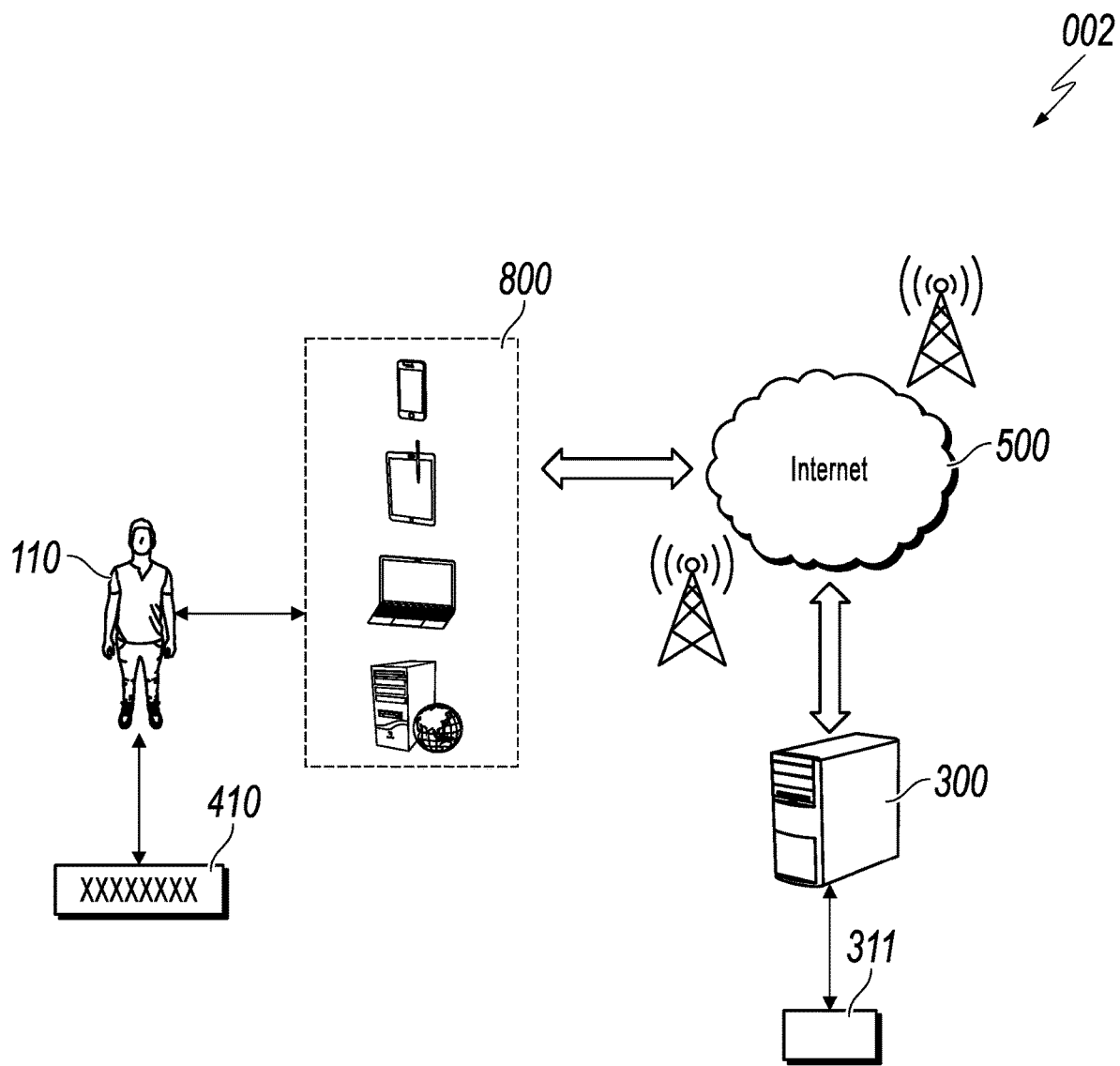
FIG. 5 is a schematic diagram illustrating an example of a system for associating a wireless communications device with a biometric feature, according to one or more embodiments of the present specification.

The present specification further provides a payment method P200 for associating a wireless communications device with a biometric feature and a system 002 for associating a wireless communications device with a biometric feature. FIG. 5 is a schematic diagram illustrating an example of a system 002 for associating a wireless communications device with a biometric feature (hereinafter referred to as a system 002), according to one or more embodiments of the present specification. As shown in FIG. 5, the system 002 can include a target user 110, a client device 800, a payment platform 300, and the Internet 500. The target user 110, the payment platform 300, and the Internet 500 are consistent with those in the system 001. Details are omitted here for simplicity.

The client device 800 can be an intelligent electronic device of the target user 110. The client device 800 can include but is not limited to a smartphone, a mobile device, a tablet, a notebook, a built-in device or similar content of a motor vehicle, etc., or any combination thereof. In some embodiments, the client device 800 can include a smartphone, a personal digital assistant (PDA), a game device, a navigation device, a POS device, etc., or any combination thereof. In some embodiments, the intelligent electronic device can include but is not limited to a notebook, a tablet, a smart home device, a wearable device, a virtual reality device, an augmented reality device, etc., or any combination thereof. In some embodiments, the smart home device can include an intelligent lighting device, a control device of an intelligent electrical device, an intelligent handheld transceiver, etc., or any combination thereof. In some embodiments, the wearable device can include a smart bracelet, a smart shoe, smart glasses, a smart helmet, a smart watch, smart clothing, a smart backpack, a smart accessory, etc., or any combination thereof. In some embodiments, the virtual reality device and/or the augmented reality device can include a virtual reality helmet, virtual reality glasses, a virtual reality patch, an augmented reality helmet, augmented reality glasses, an augmented reality patch, etc., or any combination thereof. For example, the virtual reality device and/or the augmented reality device can include Google glasses, Oculus Rift, Hololens, and Gear VR.

A target APP corresponding to the payment platform 300 can be mounted on the client device 800. The target APP can exchange data with the payment platform 300 through the Internet 500. Hardware of the client device 800 is similar to that of the payment platform 300, and the schematic hardware diagram of the payment platform 300 shown in FIG. 2 is also applicable to the client device 800. The payment platform 300 and the client device 800 can also store data or instructions for performing the method P200 for associating a wireless communications device with a biometric feature described in the present specification, and can execute or be configured to execute the data and/or instructions.

Figure 6:
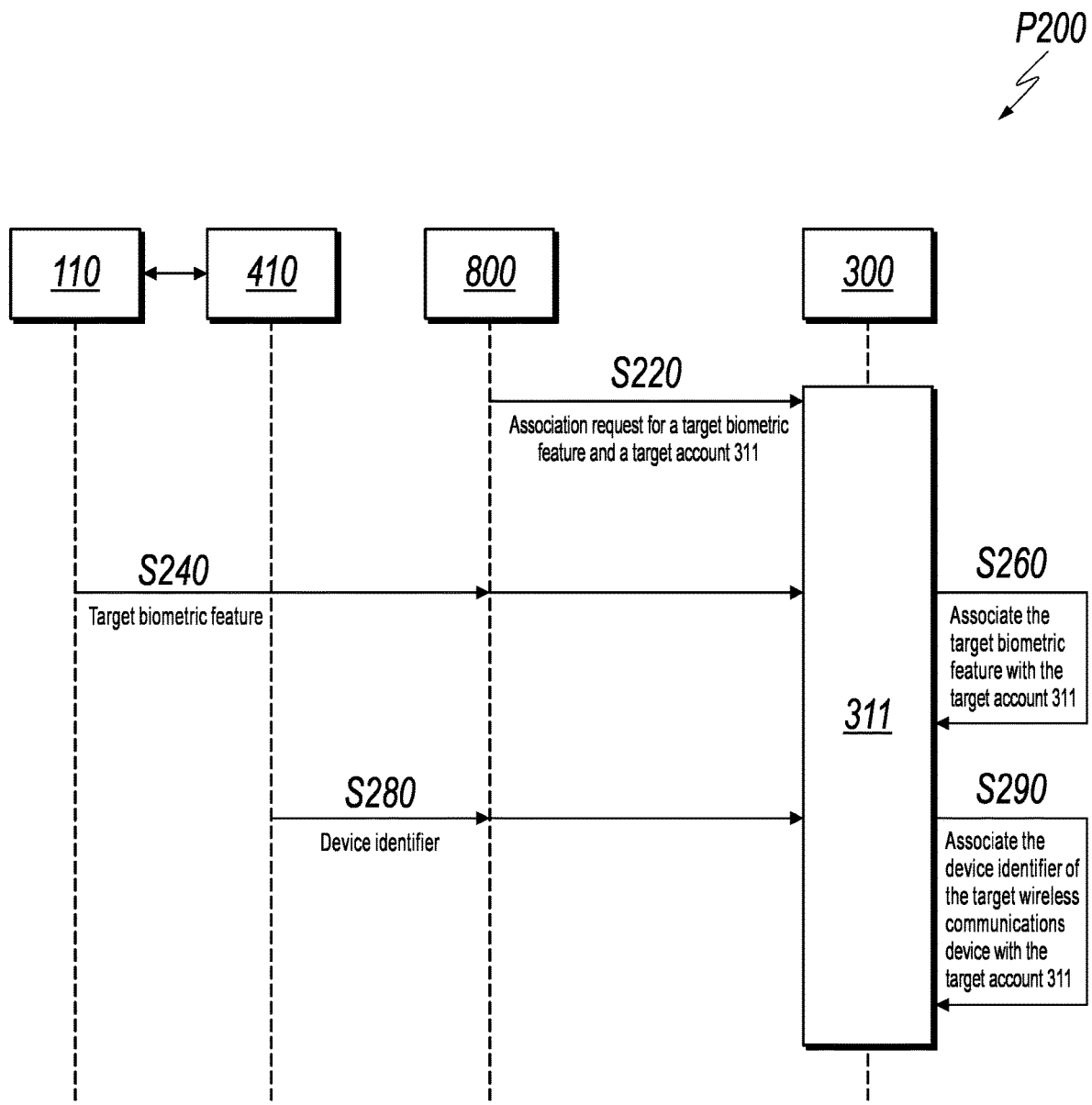
FIG. 6 is a flowchart illustrating an example of a method for associating a wireless communications device with a biometric feature, according to one or more embodiments of the present specification.

FIG. 6 is a flowchart illustrating an example of a method P200 for associating a wireless communications device with a biometric feature, according to one or more embodiments of the present specification. Specifically, the processor 302 in the payment platform 300 can read an instruction set stored in a local storage medium of the payment platform 300, and a processor in the client device 800 can read an instruction set stored in a local storage medium of the client device 800, and then perform the method P200 provided in the present specification based on regulations of the instruction set. The method P200 can include the following steps.

S220. The payment platform 300 receives an association request sent by the client device 800 for associating the target wireless communications device 410 and a target biometric feature with the target account 311. The target biometric feature is a target biometric feature of the target user 110. The target wireless communications device 410 can be an NFC device, a Bluetooth device, a Wi-Fi device, etc.

S240. The client device 800 collects the target biometric feature, and sends the target biometric feature to the payment platform 300. Specifically, a palmprint image, a face image, a bone image, an iris image, a sclera image, etc. of the target user 110 can be collected by using a camera of the client device 800. A fingerprint feature of the target user 110 can be collected by using a fingerprint collection module of the client device 800. A voiceprint feature of the target user 110 can be collected by using a voiceprint collection module of the client device 800.

S260. The payment platform 300 associates the target biometric feature with the target account 311. Specifically, after receiving the target biometric feature sent by the client device 800, the payment platform 300 can perform calculation processing on the biometric feature, extract feature data in the biometric feature, and associate the feature data with the target account 311.

S280. The client device 800 sends a device identifier of the target wireless communications device 410 to the payment platform 300. Specifically, the payment platform 300 sends guide information to the client device 800 to instruct the target user 110 to upload the device identifier of the target wireless communications device 410 by using the client device 800.

S290. The payment platform 300 associates the device identifier of the target wireless communications device 410 with the target account 311.

In conclusion, according to the method P200 and the system 002 for associating a wireless communications device with a biometric feature provided in the present specification, the target wireless communications device 410 and the biometric feature can be associated with the target account 311 by using the client device 800, so that an association relationship between the target wireless communications device 410 and the biometric feature is established to implement binding, thereby laying a foundation for performing the payment method P100 based on wireless communication and biometric features.

In conclusion, according to the payment method P100 and system 001 based on wireless communication and biometric features provided in the present specification, the wireless communications device 400 and the biometric feature are bound to the account 310, the wireless communications device 400 within the wireless communication range is recognized by using the payment collection system 200, and a sample base of biometric feature recognition is narrowed from all samples on the payment platform 300 to the wireless communications device 400 within the wireless communication range, so that the speed and the accuracy of biometric feature recognition can be improved, the passing speed can be improved, and the payment time is shortened, thereby improving the efficiency and the user experience.

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily require a particular order or a sequential order to achieve the desired results. In some implementations, multi-tasking and parallel processing can be advantageous.

In conclusion, after reading the detailed disclosure, a person skilled in the art can understand that the detailed disclosure can be presented only in an example way, and can be not restrictive. Although not explicitly stated here, a person skilled in the art can understand that the needs of the present specification encompass various reasonable changes, improvements, and modifications to the embodiments. These changes, improvements and modifications are intended to be presented by the present specification and are within the spirit and scope of the example embodiments of the present specification.

In addition, certain terms in the present specification have been used to describe the embodiments of the present specification. For example, "one embodiment", "embodiments", and/or "some embodiments" mean or means that a specific characteristic, structure, or feature described with reference to the embodiment(s) can be included in at least one embodiment of the present specification. Therefore, it can be emphasized and understood that two or more references to "embodiments" or "one embodiment" or "alternative embodiments" in various parts of the present specification do not necessarily refer to the same embodiments. In addition, the specific characteristic, structure, or feature can be appropriately combined in one or more embodiments of the present specification.

It should be understood that, in the previous description of the embodiments of the present specification, to help understand a feature, for purposes of simplifying the present specification, various features are combined in a single embodiment, figure, or description thereof. However, this does not mean that a combination of these features is mandatory. A person skilled in the art can certainly extract some of the features for a separate embodiment when reading the present specification. In other words, the embodiments of the present specification can also be understood as integration of multiple secondary embodiments. The content of each secondary embodiment also holds true when not all features of a single embodiment previously disclosed are described.

Each patent, patent application, publication of a patent application, and other materials, such as articles, books, specifications, publications, documents, articles, etc., cited here can be incorporated here by reference. All content used for all purposes are associated with this document now or in the future except for any related prosecution file history, which may be inconsistent with or conflicting with this document, or any identical prosecution file history which may have limiting impact on the widest scope of the claims. For example, if the description, definition and/or use of terms associated with any included material are or is inconsistent or conflicting with the description, definition and/or use of terms related to this document, the terms in this document prevail.

Finally, it should be understood that the embodiments disclosed in the present specification describe the principles of the embodiments of the present specification. Other modified embodiments are also within the scope of the present specification. Therefore, the embodiments disclosed in the present specification are merely examples instead of limitations. A person skilled in the art can use an alternative configuration according to the embodiments of the present specification to implement the application in the present specification. Therefore, the embodiments of the present specification are not limited to the embodiments accurately described in the present application.

What is claimed is:

1. A computer-implemented method, comprising:
   determining, at a payment collection device of a payment collection system, at least one wireless communications device separate from the payment collection device is within a wireless communication range of the payment collection device of the payment collection system;
   establishing, by the payment collection device, a short-range wireless communication connection to the at least one wireless communications device in response to the determination;
   obtaining a device identifier of the at least one wireless communications device based on the short-range wireless communication connection;
   obtaining, from a payment platform of the payment collection system and wherein the payment platform is separate from the payment collection device, data specifying at least one account associated with the at least one wireless communications device and data specifying a biometric feature associated with the at least one account based on the device identifier, wherein the at least one wireless communications device is in a one-to-one correspondence with the at least one account, and wherein the payment platform stores data for multiple different accounts associated with multiple device identifiers;
   receiving, by use of a biometric feature collection device disposed on the payment collection device, data specifying a target biometric feature of a target user;
   determining, by the payment collection device, whether the target biometric feature matches the biometric feature associated with the at least one account;
   in response to determining that the target biometric feature matches the biometric feature associated with the at least one account, determining, by the payment collection device, a target account of the target user based on the at least one account; and
   performing a deduction operation on the target account.

2. The computer-implemented method of claim 1, wherein the short-range wireless communication connection comprises a near field communication (NFC) connection, and wherein the wireless communications device comprises an NFC device.

3. The computer-implemented method of claim 1, wherein the target biometric feature of the target user is collected by the payment collection system after the short-range wireless communication connection is established and after the data specifying a biometric feature associated with the at least one account is received by the payment collection device from the payment platform, and wherein the target biometric feature comprises at least one of a facial feature, a palmprint feature, an iris feature, a scleral feature, a fingerprint feature, a voiceprint feature, or a bone feature.

4. The computer-implemented method of claim 1, wherein obtaining the device identifier of the at least one wireless communications device comprises:
   obtaining a device identifier ciphertext of the at least one wireless communications device, wherein the device identifier ciphertext is obtained through encryption based on a predetermined encryption rule; and
   obtaining the device identifier of the at least one wireless communications device by decrypting the device identifier ciphertext based on a decryption rule corresponding to the predetermined encryption rule.

5. The computer-implemented method of claim 1, wherein obtaining the data specifying the at least one account associated with the at least one wireless communications device and the data specifying the biometric feature associated with the at least one account comprises:
   sending a biometric feature acquisition request to the payment platform, wherein the biometric feature acquisition request comprises the device identifier of the at least one wireless communications device; and
   receiving the data specifying the at least one account associated with the at least one wireless communications device and the data specifying the biometric feature associated with the at least one account from the payment platform.

6. The computer-implemented method of claim 1, wherein performing the deduction operation on the target account comprises:
   sending a deduction operation request for the target account to the payment platform, wherein the deduction operation request comprises a deduction fee; and
   receiving the deduction fee from the payment platform.

7. A computer-implemented system, comprising:
   computers implementing payment collection system that includes a payment collection device and a payment platform separate from the payment collection device; and computer memory devices interoperably coupled with the computers and having tangible, non-transitory, machine-readable media storing one or more instructions that, when executed by the computers, perform one or more operations comprising:

determining, at the payment collection device of the payment collection system, at least one wireless communications device separate from the payment collection device is within a wireless communication range of a payment collection system;

establishing, by the payment collection device, a short-range wireless communication connection to the at least one wireless communications device in response to the determination;

obtaining a device identifier of the at least one wireless communications device based on the short-range wireless communication connection;

obtaining, from the payment platform of the payment collection system, data specifying at least one account associated with the at least one wireless communications device and data specifying a biometric feature associated with the at least one account based on the device identifier, wherein the at least one wireless communications device is in a one-to-one correspondence with the at least one account, and wherein the payment platform stores data for multiple different accounts associated with multiple device identifiers;

receiving, by use of a biometric feature collection device disposed on the payment collection device, data specifying a target biometric feature of a target user;

determining, by the payment collection device, whether the target biometric feature matches the biometric feature associated with the at least one account;

in response to determining by the payment collection device, that the target biometric feature matches the biometric feature associated with the at least one account, determining a target account of the target user based on the at least one account; and performing a deduction operation on the target account.

8. The computer-implemented system of claim 7, wherein the short-range wireless communication connection comprises a near field communication (NFC) connection, and wherein the wireless communications device comprises an NFC device.

9. The computer-implemented system of claim 7, wherein the target biometric feature of the target user is collected by the payment collection system after the short-range wireless communication connection is established and after the data specifying a biometric feature associated with the at least one account is received by the payment collection device from the payment platform, and wherein the target biometric feature comprises at least one of a facial feature, a palmprint feature, an iris feature, a scleral feature, a fingerprint feature, a voiceprint feature, or a bone feature.

10. The computer-implemented system of claim 7, wherein obtaining the device identifier of the at least one wireless communications device comprises:

obtaining a device identifier ciphertext of the at least one wireless communications device, wherein the device identifier ciphertext is obtained through encryption based on a predetermined encryption rule; and obtaining the device identifier of the at least one wireless communications device by decrypting the device identifier ciphertext based on a decryption rule corresponding to the predetermined encryption rule.

11. The computer-implemented system of claim 7, wherein obtaining the data specifying the at least one account associated with the at least one wireless communications device and the data specifying the biometric feature associated with the at least one account comprises:

sending a biometric feature acquisition request to the payment platform, wherein the biometric feature acquisition request comprises the device identifier of the at least one wireless communications device; and receiving the data specifying the at least one account associated with the at least one wireless communications device and the data specifying the biometric feature associated with the at least one account from the payment platform.

12. The computer-implemented system of claim 7, wherein performing the deduction operation on the target account comprises:

sending a deduction operation request for the target account to the payment platform, wherein the deduction operation request comprises a deduction fee; and receiving the deduction fee from the payment platform.

13. A non-transitory, computer-readable medium storing one or more instructions executable by a computer system to perform operations comprising:

determining, at a payment collection device of a payment collection system, at least one wireless communications device separate from the payment collection device is within a wireless communication range of the payment collection device of the payment collection system;

establishing, by the payment collection device, a short-range wireless communication connection to the at least one wireless communications device in response to the determination;

obtaining a device identifier of the at least one wireless communications device based on the short-range wireless communication connection;

obtaining, from a payment platform of the payment collection system and wherein the payment platform is separate from the payment collection device, data specifying at least one account associated with the at least one wireless communications device and data specifying a biometric feature associated with the at least one account based on the device identifier, wherein the at least one wireless communications device is in a one-to-one correspondence with the at least one account, and wherein the payment platform stores data for multiple different accounts associated with multiple device identifiers;

receiving, by use of a biometric feature collection device disposed on the payment collection device, data specifying a target biometric feature of a target user;

determining, by the payment collection device, whether the target biometric feature matches the biometric feature associated with the at least one account;

in response to determining that the target biometric feature matches the biometric feature associated with the at least one account, determining, by the payment collection device, a target account of the target user based on the at least one account; and performing a deduction operation on the target account.

14. The non-transitory, computer-readable medium of claim 13, wherein the short-range wireless communication connection comprises a near field communication (NFC) connection, and wherein the wireless communications device comprises an NFC device.

15. The non-transitory, computer-readable medium of claim 13, wherein the target biometric feature of the target user is collected by the payment collection system after the short-range wireless communication connection is established and after the data specifying a biometric feature associated with the at least one account is received by the payment collection device from the payment platform, and wherein the target biometric feature comprises at least one of a facial feature, a palmprint feature, an iris feature, a scleral feature, a fingerprint feature, a voiceprint feature, or a bone feature.

16. The non-transitory, computer-readable medium of claim 13, wherein obtaining the device identifier of the at least one wireless communications device comprises:
  obtaining a device identifier ciphertext of the at least one wireless communications device, wherein the device identifier ciphertext is obtained through encryption based on a predetermined encryption rule; and
  obtaining the device identifier of the at least one wireless communications device by decrypting the device identifier ciphertext based on a decryption rule corresponding to the predetermined encryption rule.

17. The non-transitory, computer-readable medium of claim 13, wherein obtaining the data specifying the at least one account associated with the at least one wireless communications device and the data specifying the biometric feature associated with the at least one account comprises:
  sending a biometric feature acquisition request to the payment platform, wherein the biometric feature acquisition request comprises the device identifier of the at least one wireless communications device; and
  receiving the data specifying the at least one account associated with the at least one wireless communications device and the data specifying the biometric feature associated with the at least one account from the payment platform.

* * * * *